Dec. 1, 1953    O. H. LUDEMAN    2,660,986
MOTOR HAVING HYDRAULICALLY OPERATED VALVE
Filed July 1, 1949    3 Sheets-Sheet 1

INVENTOR.
OSCAR H. LUDEMAN
BY
*James G. Bethell*
ATTORNEY

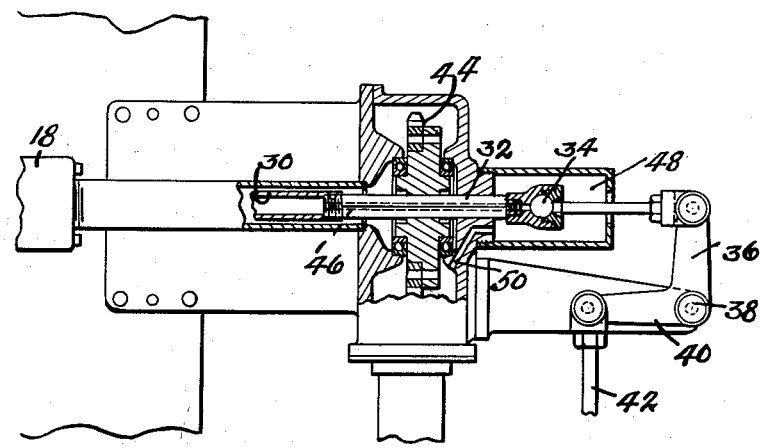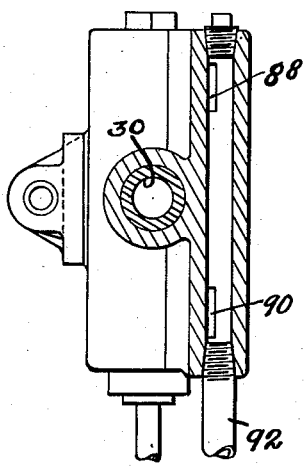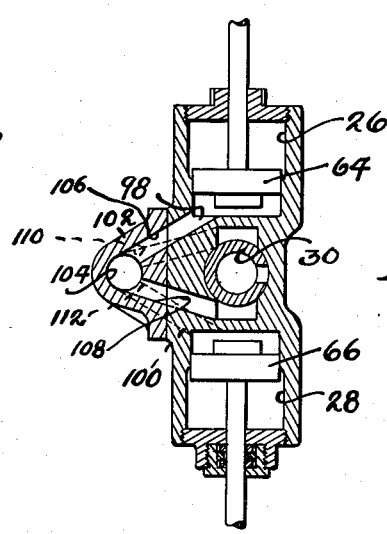

Dec. 1, 1953        O. H. LUDEMAN        2,660,986
MOTOR HAVING HYDRAULICALLY OPERATED VALVE
Filed July 1, 1949        3 Sheets-Sheet 3
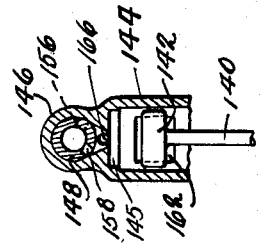
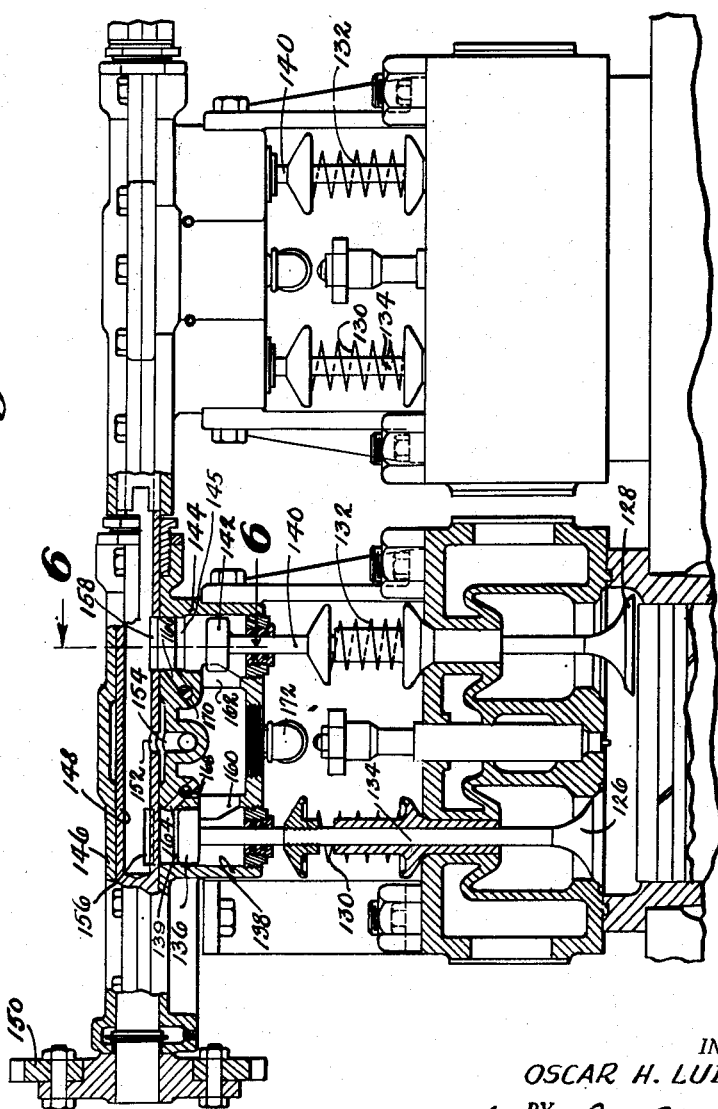
INVENTOR.
OSCAR H. LUDEMAN
BY
James G. Bethell
ATTORNEY Patented Dec. 1, 1953

2,660,986

UNITED STATES PATENT OFFICE 2,660,986

MOTOR HAVING HYDRAULICALLY OPERATED VALVE

Oscar H. Ludeman, New York, N. Y.

Application July 1, 1949, Serial No. 102,544

4 Claims. (Cl. 121—150)

My invention relates to an improvement in valve operating mechanisms for motor valves, such as valve operating mechanism for steam engines, mobile as well as stationary, internal combustion engines, air compressors, etc., and its primary object is to provide a very much simplified construction wherein the cams, cam rollers, rockers and gears conventionally employed are eliminated.

A further object of my invention is to eliminate the noise inherent in valve gearing, as now constructed, and to provide instead a much simpler and quieter mechanism, and at the same time effect a material saving in manufacturing costs and maintenance.

Generally speaking, my invention provides a construction wherein the valves are hydraulically opened, as by oil under pressure, for example, which enables me to displace the rollers, rockers, cams and gears as at present employed.

As will be brought out hereinafter, in detail, the valves are opened hydraulically and closed by a spring. In steam engine application, for example, the oil for opening the valves may conveniently be taken from the same source as the oil used in the oiling system of the engine. It may be noted that to provide the additional oil required for my purpose it will be necessary merely to operate the oil pumps of the engine oiling system slightly faster or, possibly in some cases, slightly to increase their size.

Aside from the features already referred to, my improved construction provides substantially instantaneous and certainly at least far more rapid valve opening than possible with conventional design and hence much less wire drawing.

As above set out, each valve is opened by pressure fluid and closed by a spring, and in my improved construction each valve stem is equipped with a clearance piston, viz., a piston loosely fitting its cylinder, and the pressure fluid is periodically admitted to the cylinder thereby intermittently to actuate the piston and open the valve. To avoid too rapid spring-closing of the valve, the clearance between piston and cylinder is reduced near the end of the cylinder to provide a retarding or dash pot effect opposing the action of the valve-closing spring. In addition, or in substitution of this dashpot effect, I may provide an adjustable choke valve to vary this cushioning.

A further object of my invention is to provide a construction for fluid opening of the valves of a motor which will necessitate the minimum in changes from existing designs.

Other and further objects of the invention will appear hereinafter.

In the drawings wherein I have illustrated two embodiments of my invention, Figures 1 and 2 are part sectional side elevational views of a steam engine of the marine type equipped with my improved valve operating mechanism.

Figure 3 is a section on the line 3—3 of Fig. 1;

Figure 4 is a section on the line 4—4 of Fig. 1;

Figure 5 is a view similar to Fig. 1 of an internal combustion engine equipped with my improved valve operating mechanism and Figure 6 is a section on the line 6—6 of Fig. 5.

Figure 1:
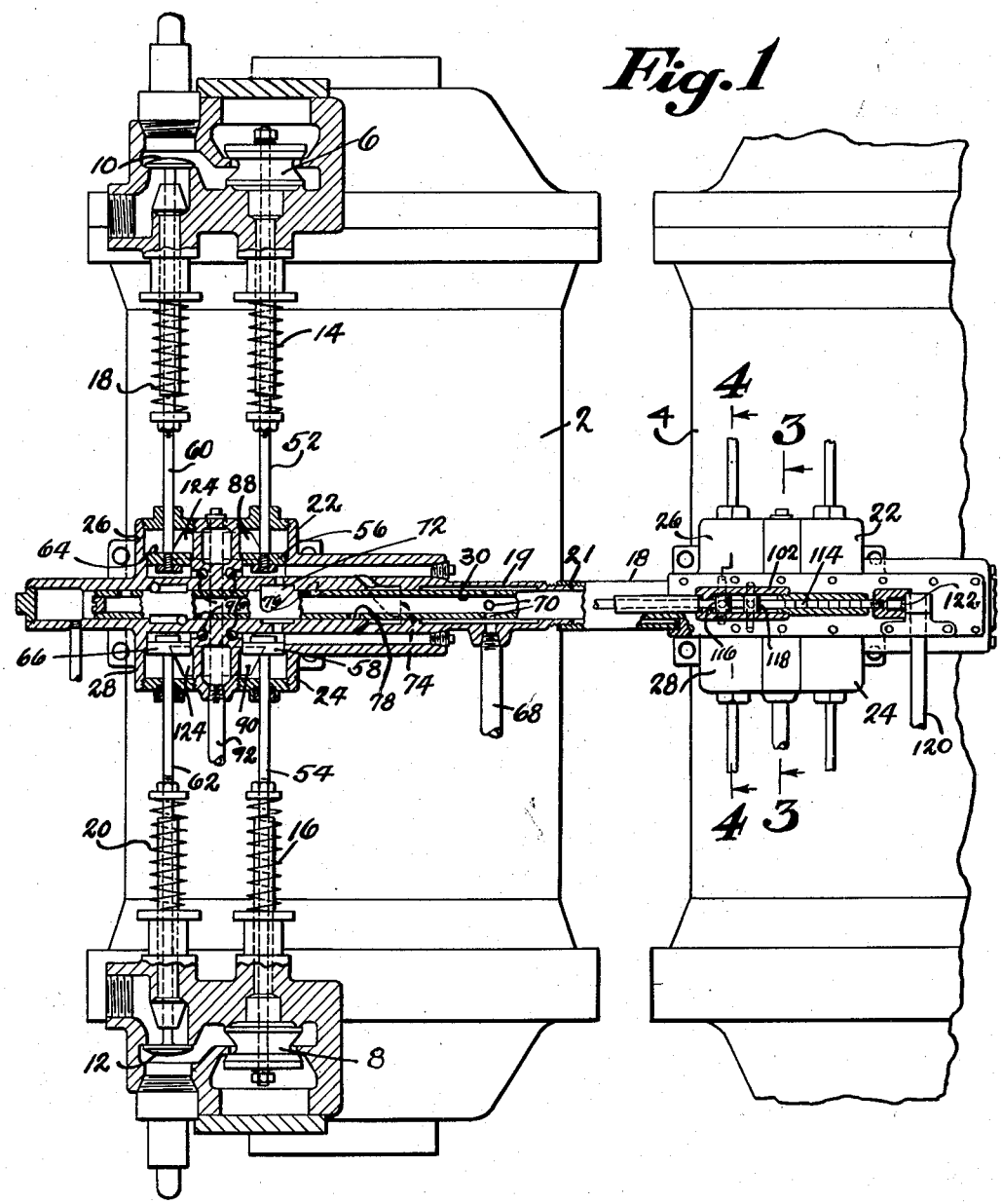

Referring to the drawings in detail, and first of all to Figs. 1-4 inclusive:

In this embodiment of my invention, for purposes of illustration I have shown my invention applied to a two cylinder marine type steam engine, the cylinders of which have been designated 2 and 4.

Each engine cylinder, in conformity with conventional practice, is equipped with a pair of main steam admission valves designated 6 and 8 and with a pair of compression relief valves designated 10 and 12. In accordance with the present invention the main admission valves 6 and 8 are opened by pressure fluid and closed by springs 14 and 16, respectively, while the compression relief valves 10 and 12, which are also opened by pressure fluid, are closed by springs 18 and 20, respectively.

Bolted across the engine at the exterior of the cylinders 2 and 4 is a casting 19, preferably made in two sections, which are secured to each other by spacer sleeve 21 and shaped to provide opposed cylinders 22 and 24 corresponding to the main admission valves 6 and 8 respectively and opposed cylinders 26 and 28 corresponding to the compression relief valves 10 and 12 respectively.

The casting 19 is also provided with a longitudinal bore for the reception of a driven tubular fluid-distributor shaft 30. This distributor shaft, at its right hand end, as viewed in the drawings, is provided with a short rod 32 which is rigidly attached thereto, the outer end of this rod being provided with a coupling 34 by which one arm 36 of a bell crank lever, which is pivoted at 38, is attached to the rod, the other arm 40 of this lever carrying an operating element 42 whereby the bell crank lever may be rocked on its pivot to shift the distributor shaft 30 to the right or left, as the case may be, the coupling 34, of course, permitting the shaft 30 to be rotated. The distributor shaft 30 adjacent its coupling end is provided with a sprocket 44 which is driven from the crank shaft of the engine through a chain, not shown, so that the shaft is driven in timed relation to the operation of the engine.

As will be brought out hereinafter, the hollow distributor shaft is running in and contains oil at all times and in order that the coupling 34 may be lubricated the rod 32 is drilled lengthwise, as shown at 46. Any oil passing the coupling 34 simply drips into sump 48 and is returned to the system by way of passageway 50. (See Fig. 2.)

The stems 52 and 54 of the main admission valves 6 and 8, respectively, are equipped with clearance pistons 56 and 58 which are to be reciprocated intermittently in the cylinders 22 and 24. The valve stems 60 and 62 of the compression relief valves are likewise equipped with similar clearance pistons 64 and 66 which are to be reciprocated intermittently in the cylinders 26 and 28.

The pressure fluid for actuating these pistons on their valve opening stroke is supplied by the continuously rotating hollow distributor shaft 30, this shaft being supplied with oil under pressure through line 68 and ports 70 in the wall of the shaft from any suitable source, as, for example, from the pump or pumps supplying oil for the lubricating system of the engine.

The casting 19 is provided with pairs of ports, 72 and 74, one pair of these ports functioning for one direction of rotation of the engine, the other pair functioning for the opposite direction of rotation. In order that pressure fluid from the distributor shaft 30 may supply pressure fluid to the ports 72 and 74, the distributor shaft 30 is provided with discharge ports 76 and 78, one set of these ports cooperating with the ports 72, the other with the ports 74, as will be brought out hereinafter.

The cylinders 22 and 24 are equipped with discharge ports 88 and 90 for exhausting oil from these cylinders back to the supply source by way of pipe 92.

The pistons 56 and 58 as well as the pistons 64 and 66 are clearance pistons, as above mentioned, that is to say, are a loose fit in their respective cylinders, no piston rings or other conventional elements being employed. In order that a pronounced cushioning effect may be provided on the valve-closing movement of all these pistons, the diameter of each of the cylinders 22, 24, 26 and 28 is reduced at the inner end of each cylinder to reduce the clearance between each piston and its cylinder.

In addition to this cushioning construction or in substitution thereof, if desired, I may provide a port adjacent the inner end of each cylinder, each of which ports is conveniently controlled by a hand operated variable setting throttling valve 96.

All parts are shown in neutral position, with valves 6, 8, 10 and 12 seated. For operation of the engine in one direction the bell crank lever at the right hand of Fig. 2 is actuated through the medium of the element 42 to shift the distributor shaft 30 lengthwise to the left, for example, it being understood, as above pointed out, that this shaft is filled with oil under pressure supplied from the pump or pumps of the lubricating system of the engine, or other suitable source.

The distributor shaft is moved to the left until its port 76 begins to cross or register with one of the ports 72.

For the purpose of description let it be assumed that the distributor shaft is shifted to bring its port 76 into register with the port 72 shown in full lines in Fig. 1. Oil under pressure is then free to discharge from the distributor shaft 30 and to pass by way of the port 72 shown in full lines in Fig. 1 to the cylinder 22 below the piston 56 for the main admission valve 6. This will lift the valve off its seat against the action of the closing spring 14. By reason of the fact that the operating fluid is under pressure this opening action of the valve is substantially instantaneous. The opening of the valve 6 will, of course, admit steam to the engine cylinder as will be understood.

It will be further appreciated that the valve 6 is to be opened only momentarily. Consequently, as the piston 56 moves upwardly to the limit of its valve-opening stroke it will have uncovered exhaust port 88 sufficiently so that the spring 14 can move the piston in the opposite direction and close the valve 6, the oil in the cylinder 22 returning to the crankcase or other source of supply by way of the oil line 92. On this return movement of the piston 56 I prevent a too abrupt seating of the valve 6 by reducing the diameter of the cylinder 22 near its inner end, thereby reducing the clearance between the piston and its cylinder. A more pronounced cushioning effect may be obtained, if necessary or desirable, by adjustment of the valve 96.

Inasmuch as the distributor shaft 30 is being rotated off the engine crank shaft, the main admission valves 6 and 8 will be opened and closed alternately, as will be understood.

To reverse the engine it is merely necessary to shift the distributor shaft 30 in the opposite direction until the port 78 is brought into register with one of the ports 74 in the casting 19 so as to reverse the order of opening and closing of the valves 6 and 8.

It will be appreciated from the foregoing that the main admission valves are operated as in conventional designs so far as sequence of operation is concerned, but that the expensive and noisy valve operating rockers, cams and rollers, etc., have been eliminated.

Not only does my construction provide for a much quieter operation of the valves but inasmuch as the distributor shaft 30 is rotated in oil at all times, wear and maintenance are reduced to a minimum.

It will be appreciated also that by the same token, manufacturing costs are materially reduced inasmuch as much less accuracy is required in the machine work on the parts involved as compared with existing constructions and in addition, the number of parts required are reduced very materially.

As already explained, I provide for the opening of the compression relief valves 10 and 12 through pressure fluid which is supplied by the distributor shaft 30.

The compression relief valves 10 and 12 are operated very similarly to the valves 6 and 8.

As will be seen from Figs. 1 and 4 particularly, the cylinder 26 corresponding to compression relief valve 10 is provided with port 98 and the cylinder 28, which corresponds to valve 12, with port 100. 102 designates a casting at the exterior of casting 19, this casting being provided with a longitudinal bore 104 and with ports 106 and 108, the port 106 maintaining cylinder port 98 in communication with bore 104, while port 108 establishes communication between the bore 104 and the interior of casting 19 about distributor shaft 30.

The casting 102 is also provided with another pair of ports 110 and 112, the port 110 maintaining communication between the bore 104 and the interior of casting 19, about distributor shaft 30, while port 112 maintains communication between bore 104 and cylinder port 100. In the bore 104 is a rod 114 carrying pistons 116 and 118.

Normally, these pistons are in the position shown in Fig. 1 so that communication between the interior of the casting 19 and the piston cylinders 26 and 28 is cut off.

When it is desired to operate the pressure relief valves 10 and 12 then the rod 114 is moved to the right or left as the case may be, in Fig. 1 through the medium of operating element 120 and coupling 122 to uncover ports 106, 108, 110 and 112 so that oil under pressure will be discharged from the distributor shaft 30 alternately to beneath the pistons 64 and 66. As a consequence, the valves 10 and 12 will be opened alternately against the action of their respective springs 18 and 20. As in the case of the main admission valve cylinders 22 and 24, the pressure relief valve cylinders 26 and 28 are equipped with exhaust ports 124 so that as the pistons 64 and 66 are actuated in the opening of the valves 10 and 12 these ports will be uncovered to permit the oil beneath the pistons to be returned to its original source, the valves closing automatically under the action of the closing springs 18 and 20. The cylinders 26 and 28 are decreased slightly in diameter at the valve-closing end thereof so as to produce a cushioning effect similar to that referred to in connection with the admission valves, and in addition I may provide the valves 96 for a more pronounced or more closely controlled cushioning effect.

It will be seen from all of the foregoing, that I have provided a construction for use in fluid driven engines, such as a marine steam engine, for example, wherein the main admission valves and the compression relief valves are hydraulically operated as distinguished from the involved valve gearing of conventional steam engine design. As above explained, the compression relief valves in the case of marine steam engines are manually controlled and are normally closed but are placed in operation in maneuvering the ship.

When my invention is applied to a stationary steam engine operating in one direction only, and governor controlled, the distributor shaft 30 will be connected operatively with the governor so as to be actuated longitudinally automatically instead of manually. (Note the angularity of the inlet ports 72.)

It will be appreciated that, inasmuch as all of the movable mechanism for operating the valves is immersed in oil at all times, that maintenance due to wearing of moving parts is reduced to a minimum.

It will be appreciated also, that my construction is very simple as compared with conventional design and that no close fits are necessary so far as moving parts are concerned, with the result that manufacturing costs are materially reduced.

It will be appreciated, furthermore, that inasmuch as the valves are hydraulically operated, and inasmuch as a cushioning effect is provided in the closing movement of the valves that the noise incident to operation of the valves is very materially reduced.

So far as manipulation of the engine is concerned, as for example, in marine engine practice, the operation of my improved construction is as elastic as any conventional design, provision having been made for readily reversing the engine and for operation of the compression relief valves when necessary, as in maneuvering a ship in which the engine is installed.

In the embodiment of my invention illustrated in Figs. 5 and 6, I have shown my invention as applied to a 2-cylinder internal combustion engine. In this embodiment of my invention, 126 designates the intake valves and 128 the exhaust valves. These valves are seated by springs 130 and 132 respectively. As illustrated in the drawings, the stems 134 of the intake valves 126 are extended beyond the engine head and at the extremity of each stem I provide a clearance piston 136 in cylinder 138. The stems 140 of the exhaust valves are also extended beyond the engine head so as to be equipped with clearance piston 142 in cylinder 144.

The valves 126 and 128 are to be opened hydraulically and closed by their springs 130 and 132 respectively, and in this connection I provide a tubular casting 146 extending lengthwise of the engine above the top of the cylinders 138 and 144 just mentioned. Rotatable within this casting is a hollow distributor shaft 148, this shaft being conveniently driven by sprocket 150 and chain direct from the engine crank shaft.

The distributor shaft 148, as will be appreciated, is constantly rotating whenever the engine is being operated and is provided with a port or ports 152 in constant communication with a port 154 in the casting 146 which is in constant communication with a pressure oil supply so that the distributor is constantly filled with pressure fluid.

The distributor shaft is also provided with ports 156 and 158. These ports are offset circumferentially of the shaft and provide for the discharge of oil under pressure from the distributor shaft to the cylinders 138 and 144 alternately above the pistons 136 and 142 respectively.

The cylinder 138 is equipped with exhaust port 160 and the cylinder 144 with a similar port 162. With the valves 126 or 128 in closed position, these exhaust ports are, of course, closed off but as each of the pistons 136 and 142 is pressure-fluid actuated to open the valve 126 or the valve 128, the exhaust port 160 or 162 will be uncovered, and the pressure above the pistons will be relieved, the port 156 or 158 in the distributor shaft having rotated out of register with the corresponding cylinder. The pistons will be moved in the opposite direction by the valve closing springs 130 and 132, displacing the oil remaining in the cylinders and discharging it therefrom through ports 160 and 162. To prevent the valves seating too quickly, the diameters of the cylinders 138 and 144 are reduced somewhat at the valve closing end of the cylinders as shown at 139 and 145 so as to provide a cushioning effect opposing the closing action of springs 130 and 132. In addition, or in substitution thereof, I may provide each of the cylinders with ports 164 and 166 controlled by hand operated valves 168 and 170 whereby the cushioning effect may be varied. The oil, as it is exhausted from the cylinders 138 and 142 on the closing movements of the valves 126 and 128 is returned to its original source by way of line 172. It will be appreciated that the provision of the exhaust ports 160 and 162 for the cylinders 138 and 144, uncovering as the pistons move outwardly of the cylinders, will prevent too sudden opening of the valves 126 and 128 because of any sudden rise in pressure of the pressure fluid.

It is believed that the operation of the engine will be clear from the foregoing. Oil under pressure is supplied by the distributor shaft 148 alternately to the cylinders 138 and 144 so as alternately to open the valves 126 and 128, the valves being closed under the action of their springs 130 and 132.

It will be appreciated, furthermore, that this embodiment of my invention has all of the advantages over conventional designs pointed out in connection with Figs. 1 to 4.

It is to be understood also that the application of my invention to the intake and exhaust valves of an internal combustion engine is illustrative and not definitive, in that in the case of a Diesel engine, for example, my invention is applicable to the oil injection valves.

It will be seen from the drawings that in each embodiment of my invention illustrated, I have shown a two cylinder engine. This is merely illustrative, and it is obvious that the number of cylinders employed is immaterial.

It is to be understood that changes may be made in the details of the construction and arrangement of parts hereinabove described within the purview of my invention.

What I claim is:

1. Valve opening mechanism for an automatically seated valve, said mechanism comprising, in combination, a cylinder, a clearance piston therein rigidly carried by the valve stem; a hollow distributor; means for rotating said distributor; a pressure fluid supply; an intake port for the distributor in constant communication with the interior of the distributor, to maintain the same supplied at all times with pressure fluid; and a discharge port for said distributor adapted to be rotated intermittently into communication with the said cylinder above the piston, intermittently to move said piston outwardly of its cylinder to open the valve against the action of its seating means, said cylinder being reduced in diameter at its inner end to retard the closing movement of the valve.

2. Valve opening mechanism for an automatically seated valve, said mechanism comprising, in combination, a cylinder, a clearance piston therein rigidly carried by the valve stem; a distributor; means for rotating said distributor; a pressure fluid supply for constantly supplying pressure fluid to the distributor; a discharge port for the distributor adapted intermittently to be rotated into communication with the cylinder above the piston, intermittently to actuate said piston to open the valve against the action of its closing means; and an exhaust port in the said cylinder initially closed by said piston, the outward movement of said piston on its working stroke uncovering said exhaust port to control the opening movement of the valve, the inner end of said cylinder being of reduced diameter to retard the inward movement of the piston to retard the closing movement of the valve.

3. Valve opening mechanism for an automatically seated valve, said mechanism comprising, in combination, a cylinder, a clearance piston therein rigidly carried by the valve stem; a hollow distributor; means for rotating said distributor; a pressure fluid supply for constantly supplying pressure fluid to the distributor interior; a discharge port in the distributor adapted intermittently to be rotated into communication with said cylinder above the piston, to apply an impulse to said piston to drive the same outwardly of its cylinder to open the valve against the action of its closing means; and an exhaust port in the cylinder outwardly of the piston when the latter is in closed-valve position, said exhaust port being gradually uncovered as the piston moves outwardly to control the opening movement of the valve and being gradually closed off as the piston moves inwardly to its initial position to control the closing movement of the valve, said cylinder being of reduced diameter at its inner end to retard the inward movement of the piston when said valve is moving toward its seat, to slow the closing movement of the valve.

4. Valve opening mechanism for an automatically seated valve, said mechanism comprising, in combination, a piston adapted to be rigidly carried by the valve stem; a cylinder for said piston, said piston having a clearance fit in said cylinder; a hollow distributor; means for rotating the same; a pressure fluid supply for constantly supplying pressure fluid to the interior of the distributor; a discharge port in the distributor adapted intermittently to be rotated into communication with said cylinder above the piston, to apply an impulse to the piston to open the valve against the action of its closing means; an exhaust port in said cylinder which is initially closed off by the said piston, said port being gradually opened as the piston is driven outwardly of its cylinder; a second exhaust port in the said cylinder; and a throttle valve therein for the controlled discharge of pressure fluid from the cylinder above the piston as the latter moves inwardly on the closing movement of the valve.

OSCAR H. LUDEMAN.

References Cited in the file of this patent

UNITED STATES PATENTS

| Number | Name | Date |
|---|---|---|
| 1,760,853 | Wood | May 27, 1930 |

FOREIGN PATENTS

| Number | Country | Date |
|---|---|---|
| 9,266 | Great Britain | of 1903 |
| 16,584 | Great Britain | of 1903 |